US008563859B1

(12) United States Patent
Baldwin et al.

(10) Patent No.: US 8,563,859 B1
(45) Date of Patent: Oct. 22, 2013

(54) TAMPER RESISTANT WALLPLATE

(75) Inventors: Jeffrey P. Baldwin, Phoenix, AZ (US);
Marcus J. Shotey, Scottsdale, AZ (US)

(73) Assignee: Hubbell Incorporated, Shelton, CT (US)

( * ) Notice: Subject to any disclaimer, the term of this patent is extended or adjusted under 35 U.S.C. 154(b) by 306 days.

(21) Appl. No.: 12/890,461

(22) Filed: Sep. 24, 2010

Related U.S. Application Data

(60) Provisional application No. 61/245,369, filed on Sep. 24, 2009.

(51) Int. Cl.
*H02G 3/14* (2006.01)
*H05K 5/03* (2006.01)
*H01H 9/02* (2006.01)
*H01H 13/04* (2006.01)
*H01H 19/04* (2006.01)
*H01H 21/04* (2006.01)

(52) U.S. Cl.
USPC ............................. 174/67; 174/53; 439/135

(58) Field of Classification Search
USPC ............ 174/53, 57, 66, 67, 659, 58; 439/136, 439/140, 135, 139, 141; 220/3.92, 241, 220/242; D13/156
See application file for complete search history.

(56) References Cited

U.S. PATENT DOCUMENTS

| 2,988,242 | A | | 6/1961 | Kneip |
| 4,302,624 | A | | 11/1981 | Newman |
| 4,549,778 | A | * | 10/1985 | Price et al. ................... 439/137 |
| 4,607,136 | A | * | 8/1986 | Thomas .......................... 174/67 |
| 4,640,564 | A | * | 2/1987 | Hill ................................ 439/137 |
| 4,968,856 | A | * | 11/1990 | Bowley et al. ................. 174/67 |
| 5,107,075 | A | * | 4/1992 | Currier, Jr. ..................... 174/67 |
| 5,212,347 | A | * | 5/1993 | Powers et al. ................. 174/67 |
| 5,998,735 | A | | 12/1999 | Patterson |
| 6,222,125 | B1 | * | 4/2001 | Shoemaker ................... 220/242 |
| 6,780,031 | B1 | | 8/2004 | Valls |

OTHER PUBLICATIONS

"Babyproof Your Home's Electrical Outlets With Childproof Wall Plates" www.smarthome.com, article 85671, 2010.

* cited by examiner

*Primary Examiner* — Timothy Thompson
*Assistant Examiner* — Roshn Varghese
(74) *Attorney, Agent, or Firm* — Mark S. Bicks; Alfred N. Goodman

(57) ABSTRACT

A wall plate including a base having a perimeter and a front surface, a recessed portion in the base located behind the front surface and having at least one opening for receiving an electrical receptacle face, a panel slidable within the recessed portion, a pair of release buttons for selectively permitting slidable movement of the panel, and wherein the panel is biased in the closed position.

16 Claims, 10 Drawing Sheets

TAMPER RESISTANT WALLPLATE

CROSS REFERENCE TO RELATED APPLICATIONS

This application claims the benefit of the filing date of U.S. Provisional Patent Application 61/245,369 entitled "Tamper Resistant Wallplate" to Marcus Shotey, et al. which was filed on Sep. 24, 2009, the contents of which are hereby incorporated herein by reference.

BACKGROUND

1. Technical Field

Aspects of this document relate generally to electrical wall plates and tamper resistant wall plates which restrict access to electrical devices.

2. Background Art

Electrical wall plates are conventionally used to cover electrical devices and electrical boxes to prevent electrical shock while providing an aesthetically pleasing appearance. An issue that continues to provide safety concerns is electrocution caused by children inserting metal objects into electrical receptacles. One method of preventing access to the receptacle is inserting flat plastic covers into the receptacle openings. While the cover is easy to insert, it can be removed by children and/or easily lost. Further, the cover must be removed and set aside before the receptacle can be used and the cover can easily be lost or become a choking hazard.

An alternative to plastic covers is tamper resistant electrical receptacles. Tamper resistant receptacles have slidable outlet blocks that sit behind the front face of the electrical device and move to an open position when an electrical plug is properly inserted. However, when another object or the plug is improperly inserted, the blocks prevent the object from contacting the electrified portions of the receptacle. The tamper resistant electrical receptacle has a number of disadvantages, including difficult and cumbersome installation that may require an electrician to install new tamper resistant electrical receptacles.

SUMMARY

Aspects of this document relate to electrical wall plates. In one aspect, a wall plate includes a base having a perimeter and a front surface, a recessed portion in the base located behind the front surface, the recessed portion having a backing wall with at least one opening extending therethrough sized large enough to receive an electrical receptacle face, a panel slidable within the recessed portion, and at least one release button mounted in the base and configured for selectively permitting slidable movement of the panel, wherein the panel is biased in the closed position.

Particular implementations may comprise one or more of the following features. The panel may be spring biased into the closed position. The spring may be located behind the recessed portion. The panel may be movable from the closed position upon depression of the pair of release buttons. The recessed portion may further include a guide and the panel may communicate with the guide. The release button may be connected to a locking tab extending into the recessed portion. The panel may further include a notch for receiving the locking tab in the closed position. The locking tab may be biased into the recessed portion and pivotable out of the recessed portion. The at least one release button may be operatively coupled with the panel and pressing the release button releases the panel and permits it to be movable from the closed position.

The base may define at least two sides of the recessed portion. The base may define at least three sides of the recessed portion. The panel may be slidable in only a vertical direction. The panel may be a pair of panels. The pair of panels may be slidable independently of each other. The pair of panels may be biased in opposite directions. The panel may be retained in the closed position by at least one locking tab. Each locking tab may be controlled by at least one release button.

In another aspect, a wall plate includes a base having a perimeter and a front surface, a recessed portion in the base located behind the front surface and having at least one opening for receiving an electrical receptacle face, a first panel slidable within the recessed portion, a second panel slidable within the recessed portion, a first pair of release buttons for selectively permitting slidable movement of the first panel, a second pair of release buttons for selectively permitting slidable movement of the second panel, and wherein both the first and second panels are biased in the closed position. In particular implementations, the first panel and the second panel are slidable in opposite directions.

In another aspect, a method of restricting access to an electrical receptacle includes the steps of providing a wall plate having a base with a recessed portion, an opening for receiving an electrical receptacle face, and a panel slidable within the recessed portion, compressing a pair of release buttons on the base to selectively permit movement of the panel from a first position, and sliding the panel against a biasing force to expose the electrical receptacle face in a second position. In particular implementations, the method also includes the step of returning the panel to the first position by releasing the panel when an electrical plug is not inserted in the electrical receptacle.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments of the present invention will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended operation and assembly procedures for an electrical wall plate will become apparent for use with implementations of an electrical wall plate from this disclosure. Accordingly, for example, although particular components are disclosed, such components and other implementing components may comprise any shape, size, style, type, model, version, measurement, concentration, material, quantity, and/or the like as is known in the art for such implementing components, consistent with the intended operation of an electrical wall plate.

Figure 1:
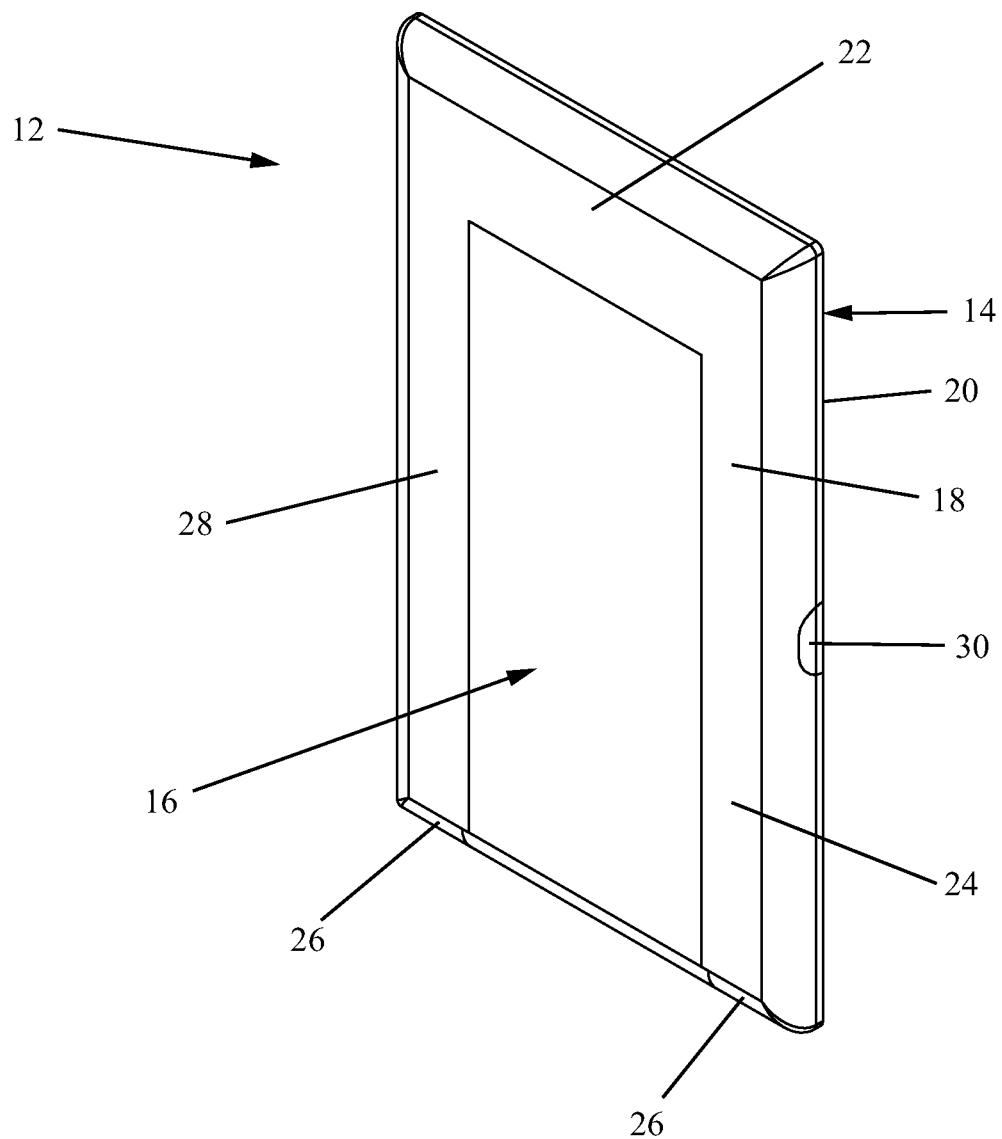
FIG. 1 is a front perspective view of a wall plate with a panel covering the outlet openings.

FIG. 1 illustrates an electrical wall plate 12 having a base 14 with a slidable panel 16 located within the base. Base 14 includes a front surface 18 and a rear surface 20 with a top side 22, a right side 24, a bottom side 26, and a left side 28. In one aspect, bottom side 26 may be separated into two sections, with each section on one side of panel 16. Further, one or more release buttons 30 and 32 are each located approximately halfway down right side 24 and/or left side 28 (not shown), respectively. By including opposing release buttons 30 and 32, one on each side of the base 14 operatively associated with the panel 16, the mechanism can be configured such that both release buttons 30 and 32 need to be pushed to release the panel 16. This acts as a further child safety feature of the electrical wall plate 12 as many young children do not have the finger dexterity and coordination to squeeze both release buttons 30 and 32 simultaneously. In other implementations, however, only one release button may be used.

Figure 2:
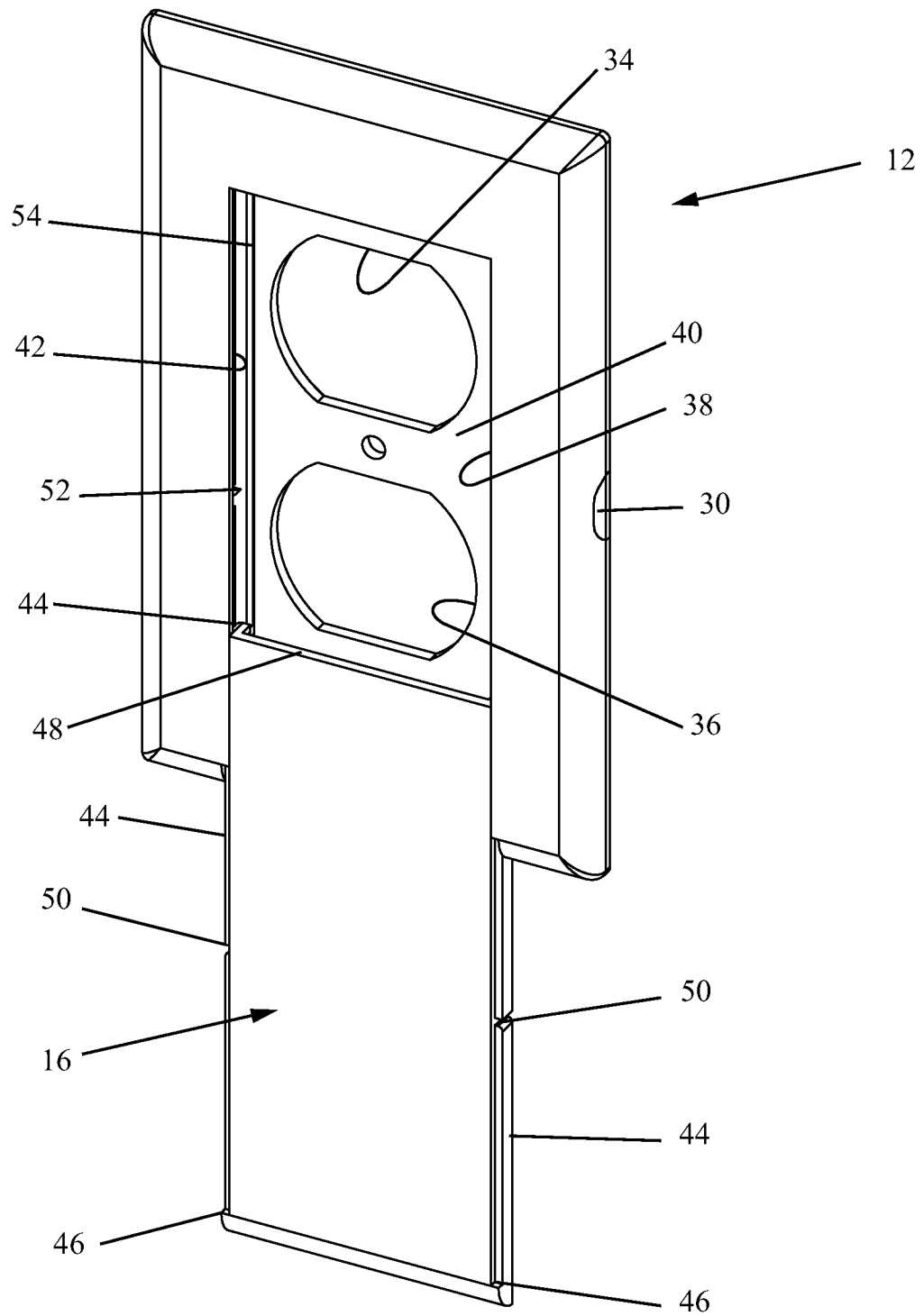
FIG. 2 is a front perspective view of a wall plate with a panel slide downward into an open position.

FIG. 2 illustrates electrical wall plate 12 with panel 16 slide downward from base 14 to expose upper opening 34 and lower opening 36 located in recessed portion 38. Specifically, recessed portion 38 is formed in base 14 by and surrounded by the perimeter of the top side, right side, and left side in one aspect. Recessed portion 38 also includes a backing wall 40 which includes openings 34 and 36. Right side 24 and left side 28 each include a guide 42 which is arranged to slidably receive an elongated protrusion 44 on the left and right sides of panel 16. Guide 42 preferably extends from the top of recessed portion 38 through the bottom of the wall plate 12 in one aspect, while elongated protrusion 44 extends the entire height of panel 16 and is arranged to communicate with guide 42 so that consistent movement of the panel is more likely. Guides 42 may also terminate at shoulders 46 proximate a bottom portion of panel 16 to restrict the panel from sliding beyond the uppermost position where top wall 48 contacts the top edge of recessed portion 38.

Panel 16 also includes a notch 50 on both the left and right sides formed in elongated protrusion 44. Notches 50 communicate with locking tabs 52 (partially visible and discussed in greater detail below) as the locking tabs 52 extend into recessed portion 38 to selectively prevent and permit sliding movement of panel 16. Further, backing wall 40 includes a pair of elongated slots 54 to allow panel 16 to be spring biased in the closed position as discussed in detail below.

Figure 3:
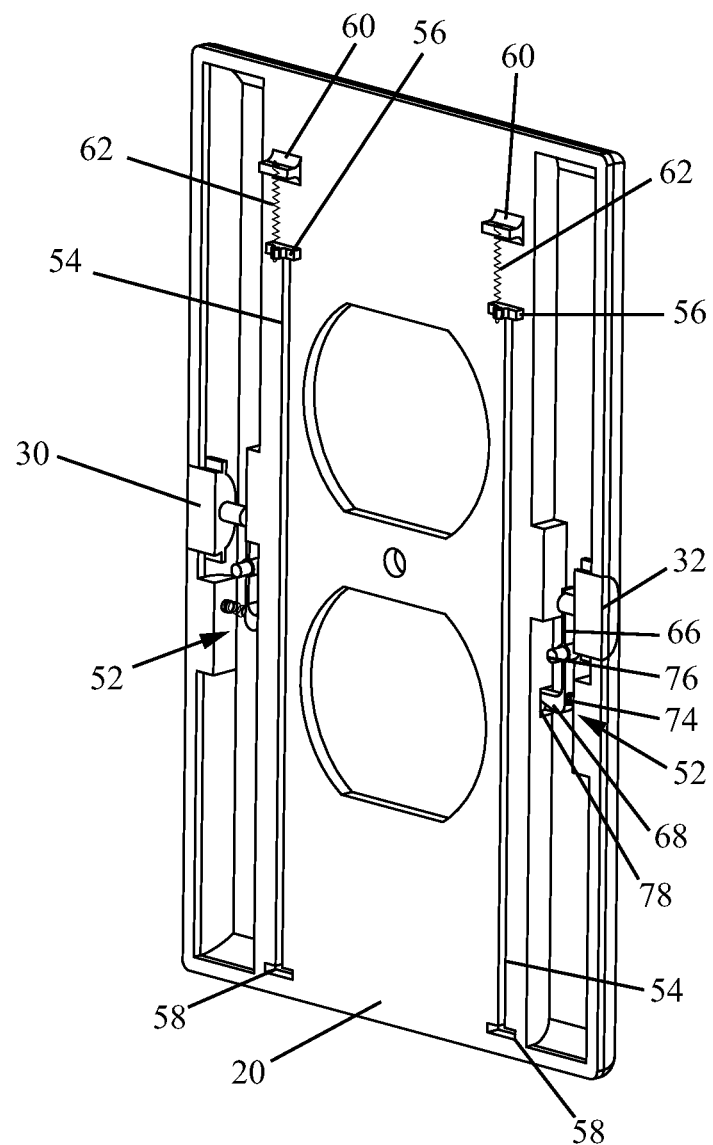
FIG. 3 is a rear perspective view of a wall plate with a panel covering the outlet openings.
Figure 4:
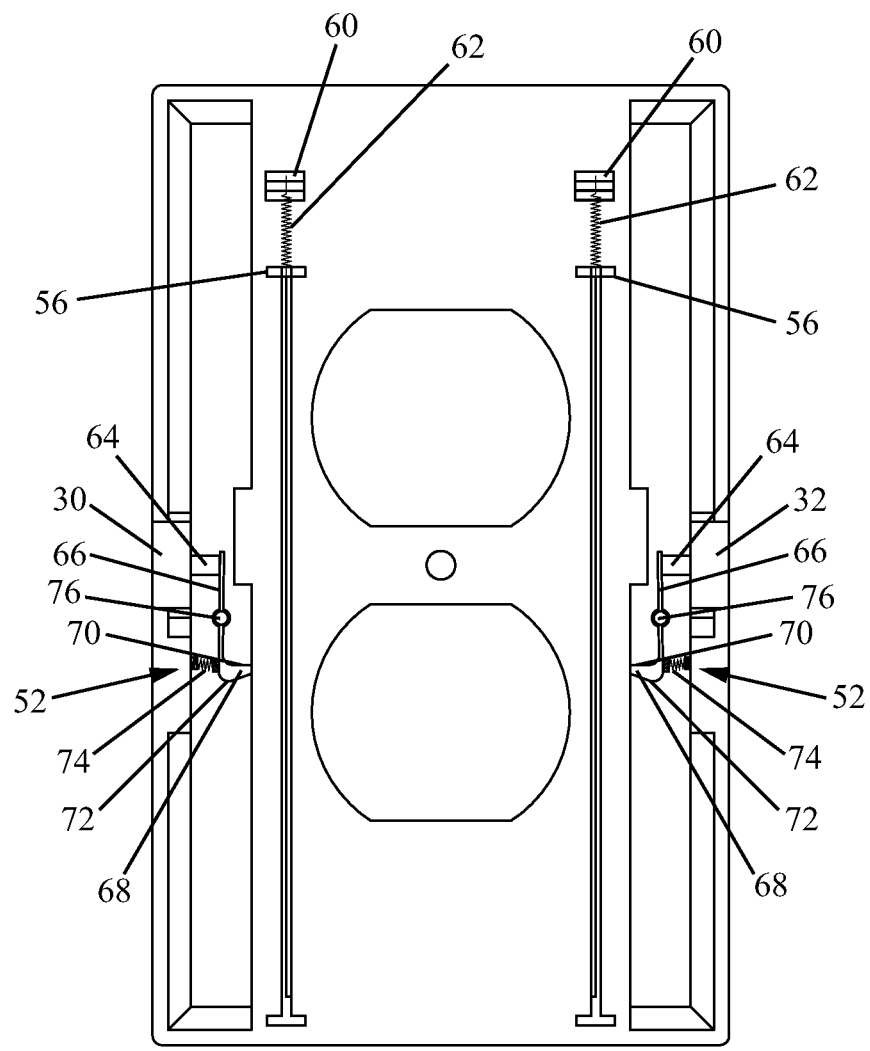
FIG. 4 is a rear elevation view of a wall plate with a panel covering the outlet openings.

FIGS. 3 and 4 illustrate rear views of wall plate 12 in the closed position with release buttons 30 and 32 in the relaxed position. Panel 16 includes a pair of mounting tabs 56 extending through and sliding along elongated slots 54. In order to install panel 16, mounting tabs 56 are inserted through apertures 58 near bottom side 26.

Mounting tabs 56 are connected to a protrusion 60 with a spring 62. Mounting tabs 56 may be located near the top of panel 16 so that spring 62 is in the relaxed state when panel 16 is completely closed. When release buttons 30 and 32 are compressed, the user pulls the spring instead of compressing the spring to move the panel from the closed position to an open position.

Release buttons 30 and 32 each include a post 64 extending inwards toward the center of the wall plate 12 that communicates with locking tab 52. Specifically, locking tab 52 includes a finger 66, a locking member 68 with a latching side 70 and a pivoting side 72, and a spring 74. Finger 66 directly contacts release button 30 or 32 to provide pivotal movement about rod 76, which may be formed integral to base 14. Spring 74 biases locking member 68 into recessed portion 38 and notches 50 of panel 16 contact latching side 70 of locking member 68 when the panel is moving downward and the notches contact pivoting side 72 when the panel is moving upwards. Locking member 68 prevents panel movement when notches 50 contact the latching side, but permit panel movement when notches 50 contact the pivoting side. For example, the angle of pivoting side 72 provides a force to compress spring 74 and permit lateral movement of locking member 68.

Figure 5:
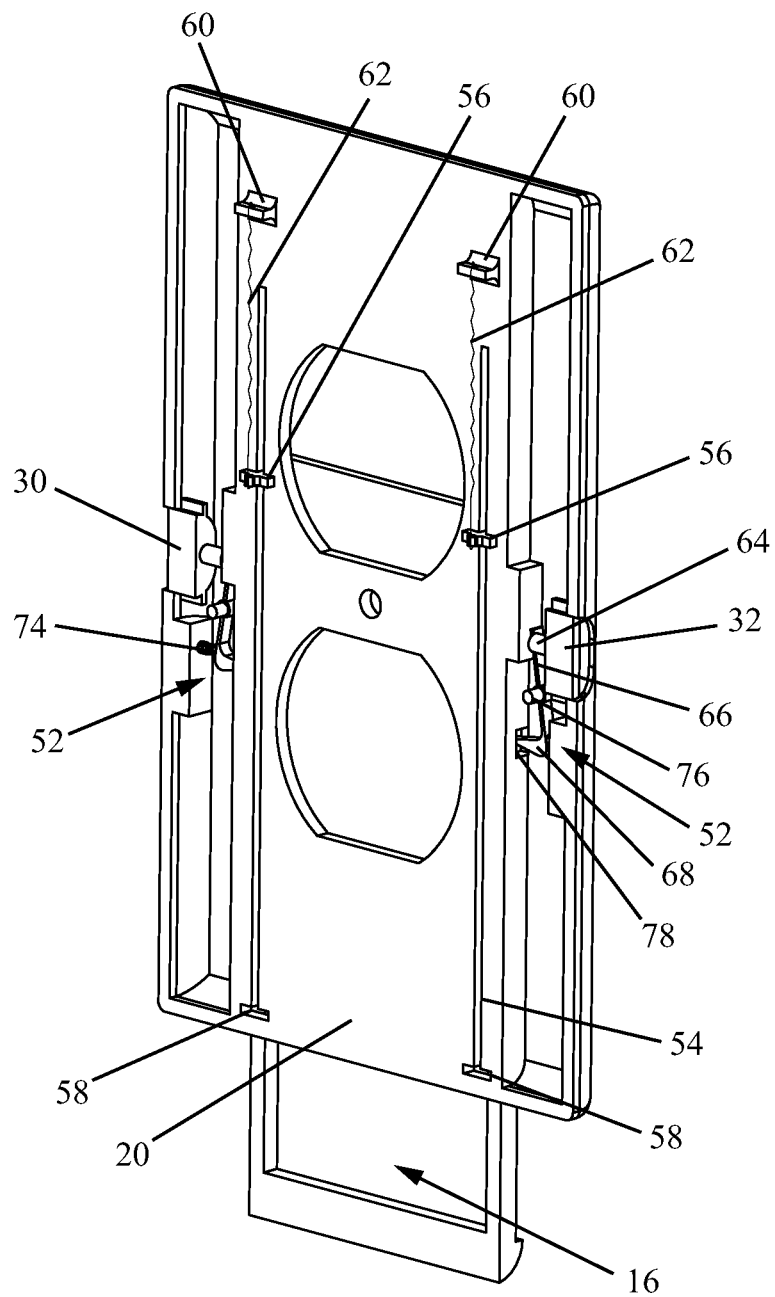
FIG. 5 is a rear perspective view of a wall plate with a panel slide downward into an open position.
Figure 6:
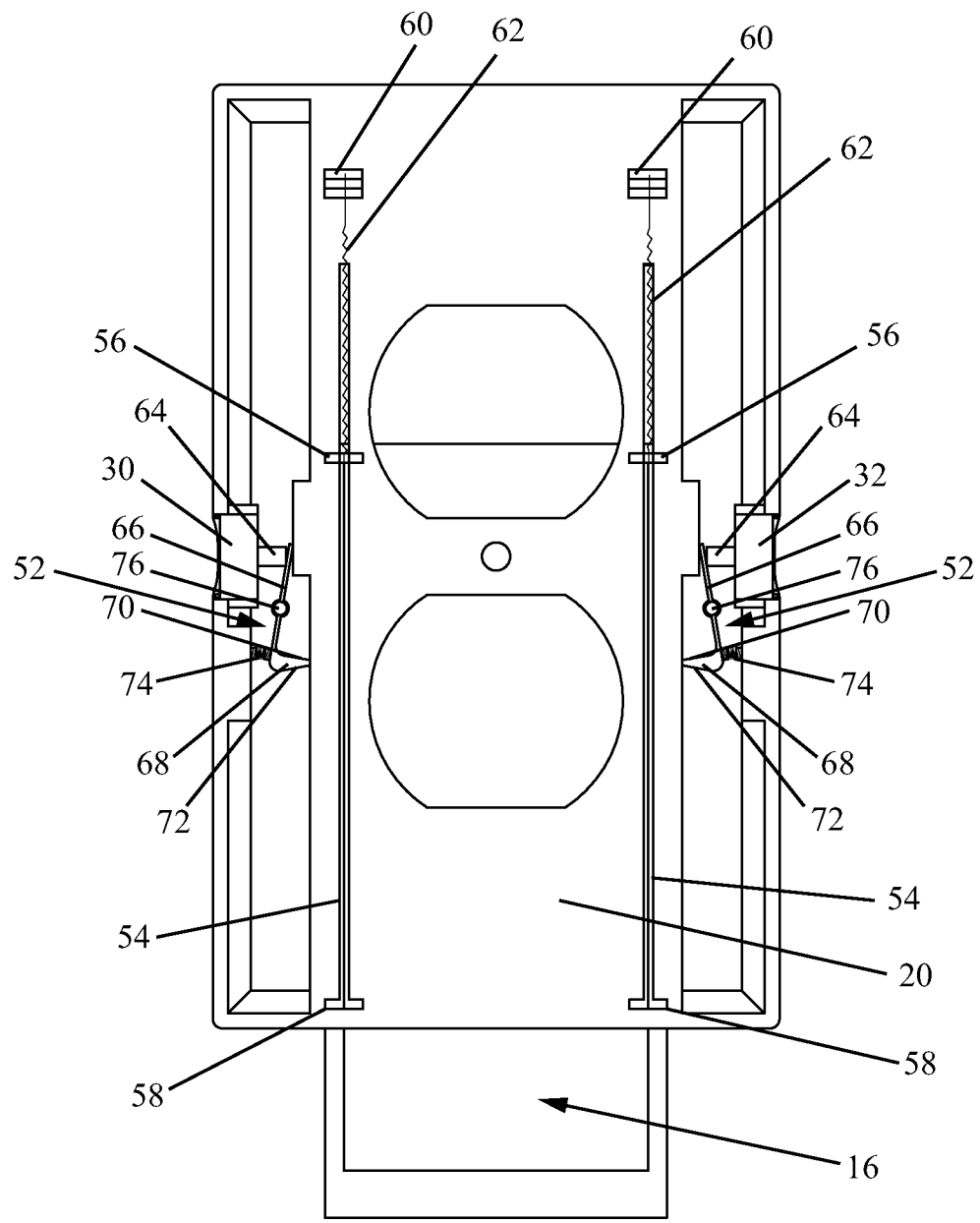
FIG. 6 is a rear elevation view of a wall plate with a panel slide downward into an open position.
Figure 7:
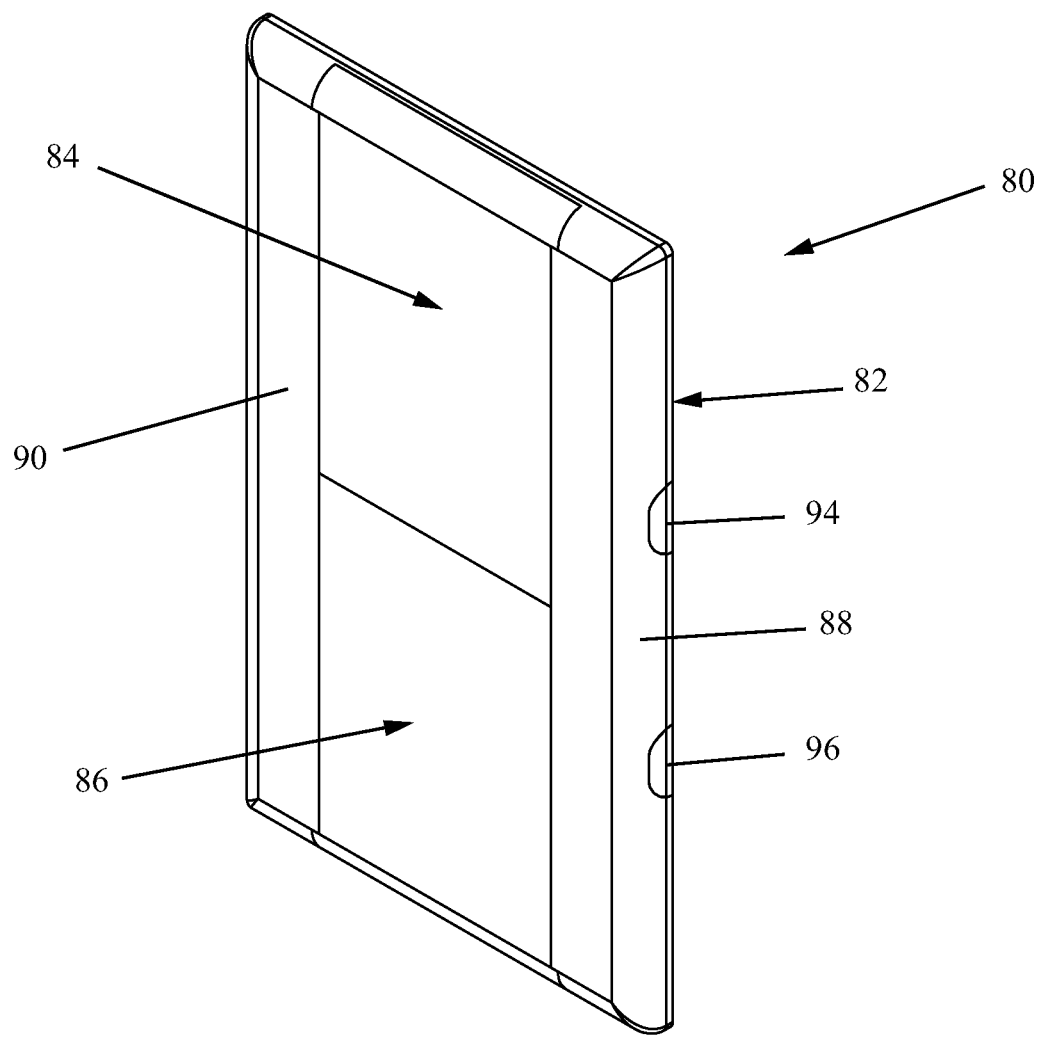
FIG. 7 is a front perspective view of a wall plate with two panels covering the outlet openings.
Figure 8:
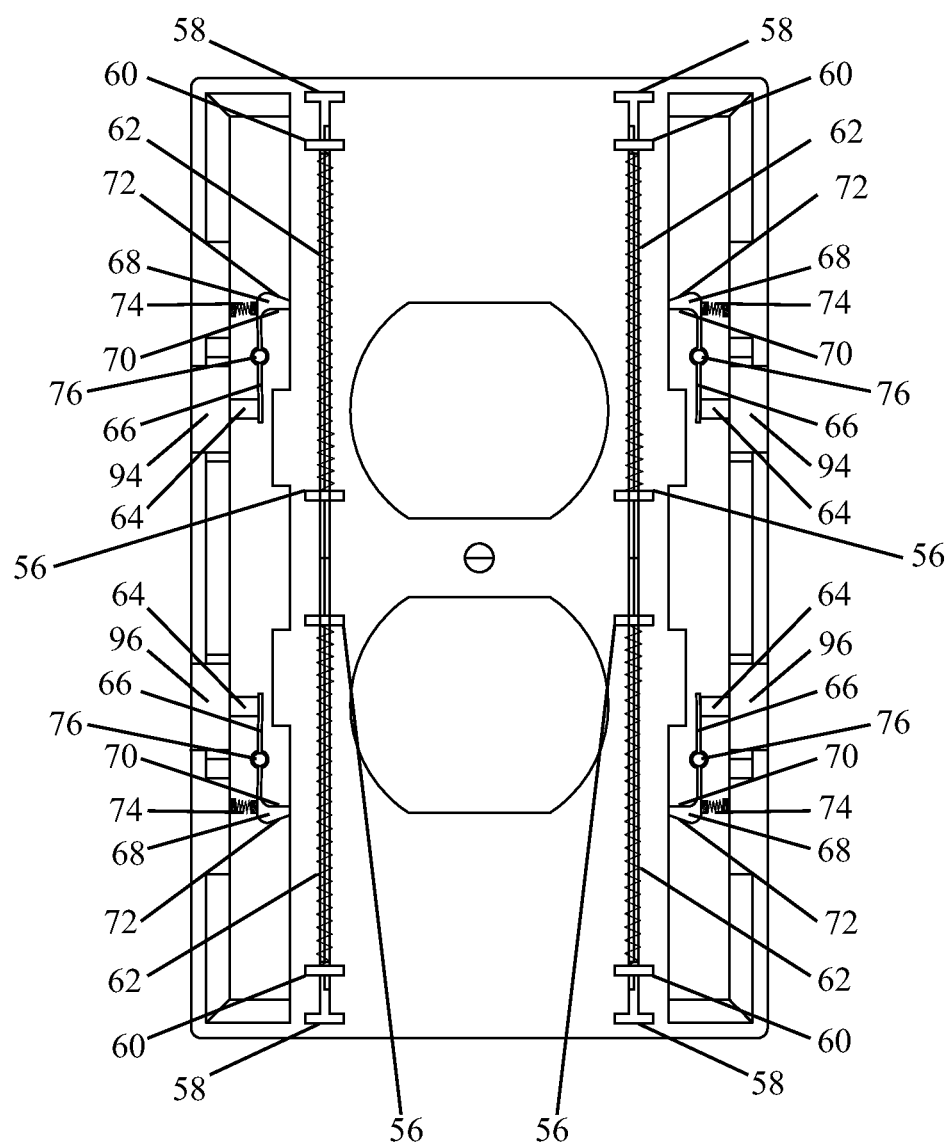
FIG. 8 is a rear elevation view of a wall plate with two panels covering the outlet openings.

FIGS. 5 and 6 illustrate rear views of wall plate 12 with panel 16 moved downward within recessed portion 38 and beyond bottom side 26 to partially expose upper opening 34. Release buttons 30 and 32 have been compressed and force each post 64 into finger 66, to pivot locking tab 52 about rod 76. This pivoting movement pulls locking member 68 out of both recessed portion 38 and notch 50 in panel 16 through an opening 78. Thus, panel 16 can be pulled downward by the user and ultimately cause elongation of spring 62. Due to the fact that there is only one set of notches 50 in panel 16, the user no longer has to continue pushing release buttons 30 and 32. However, when the panel is released, if a plug is not inserted through upper opening 34 or lower opening 36, spring 62 will return to the resting position and locking member 68 will be relocated in notch 50. This is due in part to spring 74 forcing the locking member back into recessed portion 38 and spring 62 returning panel 16 to the closed position.

While FIGS. 3 through 6 only show panel 16 moved down far enough to expose upper opening 34, panel 16 can easily be moved to the fully open position as seen in FIG. 2. In one aspect, panel 16 can only move vertically because of the arrangement between recessed portion 38 and right side 24 and left side 28 including vertical guides that prevent horizontal movement. Nevertheless, one of ordinary skill will immediately understand that horizontal movement may be incorporated without departing from the spirit or scope of the disclosure.

In another aspect, FIGS. 7 through 10 illustrate a dual panel wall plate 80. Wall plate 80 includes a base 82, with a first panel 84 and a second panel 86. Base 82 includes a right side 88 and a left side 90, with a recessed portion 92 there between. A first pair of release buttons 94 communicates with first panel 84, while a second pair of release buttons 96 communicates with second panel 86. Similar to the single panel version, each release button includes a post 64 which manipulates finger 66 to rotate locking tab 52 and move locking member 68 out of recessed portion 92. The remaining components and operation of release buttons 94, 96 are identical to release buttons 30 and 32.

First panel 84 and second panel 86 also include mounting tabs 56 that are inserted into recessed portion 92 through apertures 58. Springs 62 connect one of mounting tabs 56 to one of protrusions 60. Here, longer springs may be utilized and the springs are in the relaxed position when the first and second panels are closed and the springs are compressed when the panels are moved to the open position (FIGS. 9 and 10).

Figure 9:
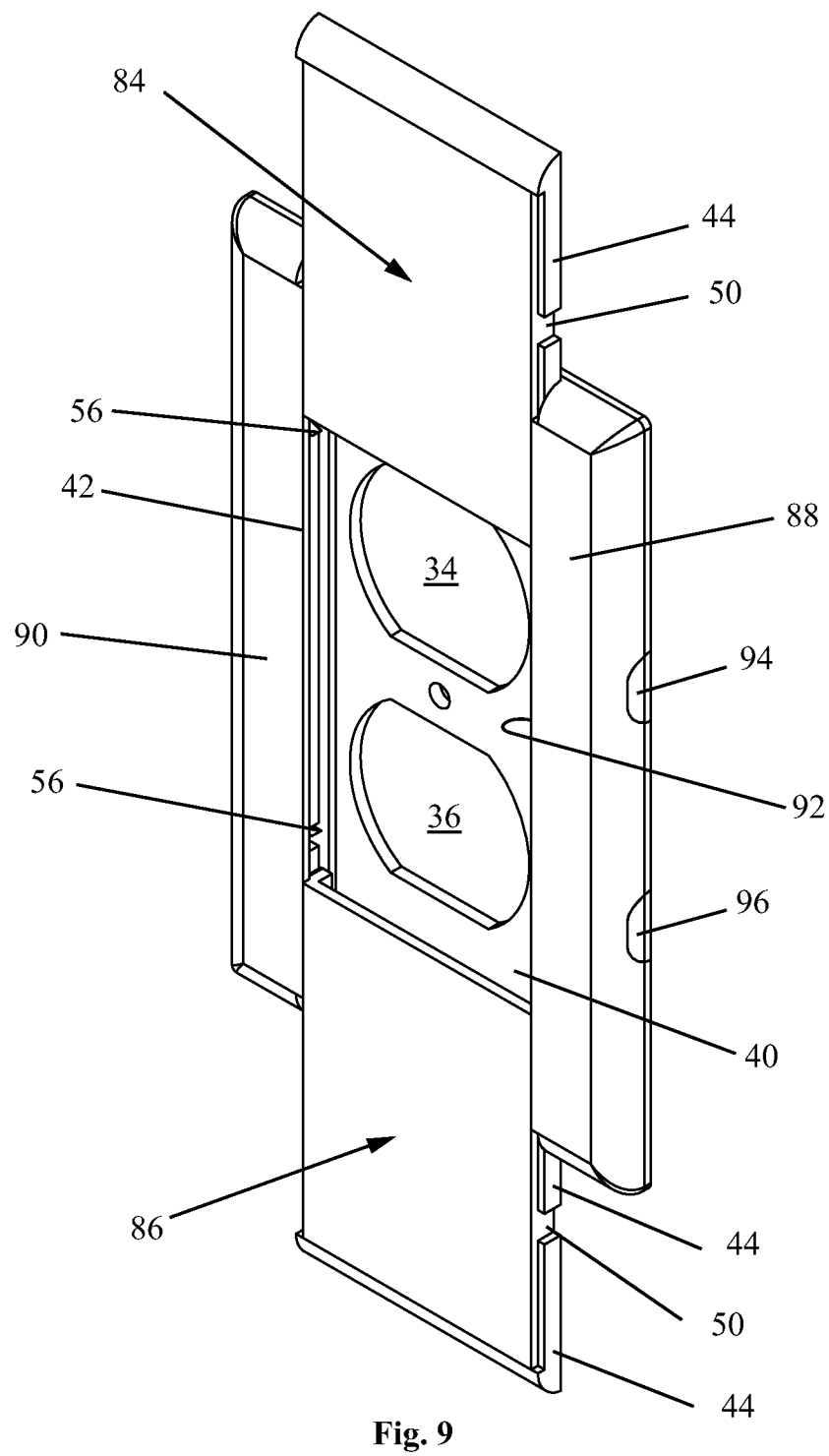
FIG. 9 is a front perspective view of a wall plate with two panels opened to provide access to the outlet openings; and, FIG. 10 is a rear elevation view of a wall plate with two panels opened to provide access to the outlet opening.
Figure 10:
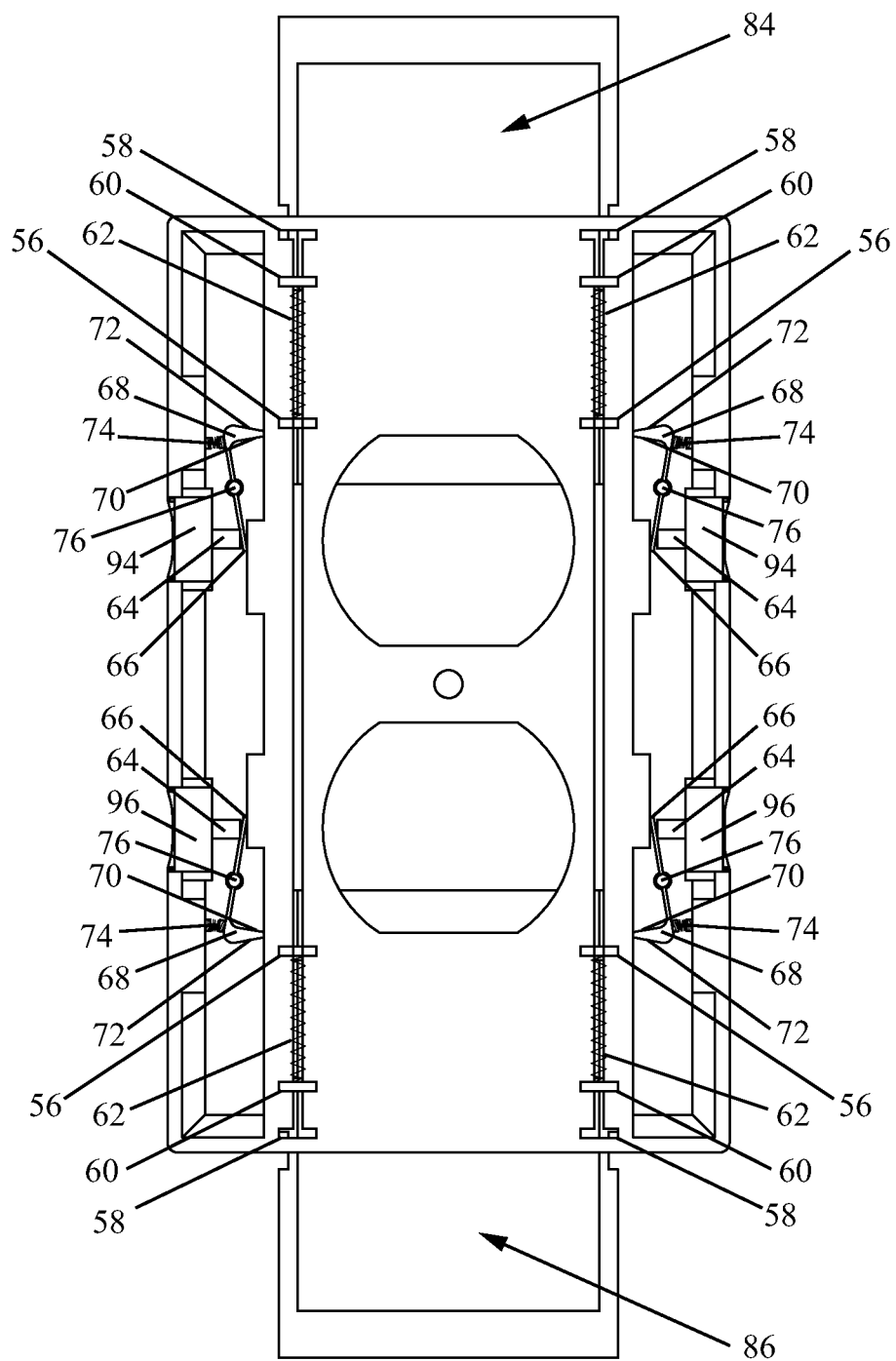

Referring to FIGS. 9 and 10, first panel 84 is slidable upwards independent of second panel 86, which is slidable downwards to provide access to openings 34 and 36 in backing wall 40. Further, recessed portion 38 includes a guide 42, while panels 84 and 86 each include elongated protrusions 44 and notches 50 structurally and functionally similar to the single panel arrangement illustrated in FIGS. 1 through 6. Due to the similarities between the single and dual panel arrangement, greater detail is not necessary.

Accordingly, the dual panel wall plate 80 incorporates a pair of panels 84 and 86, each biased by one or more springs 62 in opposing directions that independently provide access to an outlet opening by compressing their respective one or more release buttons 94 and 96, while the panels 84 and 86 are returned to their resting position to prevent access to the outlet if a plug is not inserted. A standard, non-tamper resistant, electrical device can therefore be protected and prevent unwanted access to electrical outlets by children.

In operation of implementations with two release buttons associated with each panel, the user must compress both release buttons in order to slide the locking member 68 within recessed portion 38, thereby permitting the respective panel 84 or 86 to freely move. Once the user releases the release buttons, locking members 68 contact elongated protrusions 44 and when the panel returns to the closed position, the locking members 68 enter notches 50 and prevent additional sliding movement of the panels 84 or 86 until the release buttons 94 or 96 are once again compressed. Further, springs 62 bias the panels 84 and 86 into their respective closed positions so that once the user relinquishes control of the panel 84 or 86 and a plug is not inserted into the outlet, the panels automatically return to their closed positions. If a plug is present, the springs 62 will bias the panels 84 and 86 into contact with the plug and when the plug is removed, will return the panels 84 and 86 to their closed positions.

It will be understood that implementations are not limited to the specific components disclosed herein, as virtually any components consistent with the intended operation of a method and/or system implementation for a tamper resistant wall plate may be utilized. Accordingly, for example, it should be understood that, while the drawing figures accompanying text show and describe a rectangular wall plate, the wall plate may contain any number of sides. Components may comprise any shape, size, style, type, model, version, class, grade, measurement, concentration, material, weight, quantity, and/or the like consistent with the intended operation of a method and/or system implementation for a wall plate.

The concepts disclosed herein are not limited to the specific implementations shown herein. For example, it is specifically contemplated that the components included in a particular implementation of a wall plate may be formed of any of many different types of materials or combinations that can readily be formed into shaped objects and that are consistent with the intended operation of a wall plate. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, embodiments of the wall plate may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of a wall plate, it should be readily apparent that a number of modifications may be made without departing from the spirit thereof and that these implementations may be applied to other wall plates. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:
1. A wall plate comprising:
   a base comprising a perimeter, a front surface, and a rear surface opposite the front surface;
   a recessed portion on the front surface of the base, the recessed portion comprising a backing wall with at least one opening extending therethrough sized large enough to receive an electrical receptacle face;
   two elongated slots extending through the recessed portion of the base;
   at least two protrusions extending from the rear surface of the base;
   at least one panel slidable within the recessed portion between an open position and a closed position;
   two mounting tabs coupled to the at least one panel and extending through the two elongated slots;

two springs that bias the at least one panel to the closed position, each of the two springs coupled to a different mounting tab of the two mounting tabs and a different protrusion of the at least two protrusions;

at least one release button mounted in the base and configured for selectively permitting slidable movement of the panel between the open position and the closed position.

2. The wall plate of claim 1 wherein the at least one release button is operatively coupled with the panel and pressing the release button releases the panel and permits it to be movable from the closed position.

3. The wall plate of claim 1 wherein the recessed portion further comprises a guide and the panel communicates with the guide.

4. The wall plate of claim 1 wherein the at least one release button is coupled to a locking tab extending into the recessed portion when the at least one recess button is not compressed.

5. The wall plate of claim 4 wherein the panel further comprises a notch for receiving the locking tab in the closed position.

6. The wall plate of claim 4 wherein the locking tab is biased into the recessed portion when the at least one recess button is not compressed and pivotable out of the recessed portion when the at least one recess button is compressed.

7. The wall plate of claim 1 wherein at least one button comprises at least two opposing buttons.

8. The wall plate of claim 1 wherein the recessed portion extends from a bottom side of the base toward a top side of the base.

9. The wall plate of claim 1 wherein the recessed portion extends from a bottom side of the base to a top side of the base, the at least two protrusions comprise four protrusions, and the at least one panel comprises two panels, each of the two panels comprising two mounting tabs extending through the two elongated slots and coupled to the a different one of the four protrusions with a different spring.

10. The wall plate of claim 9 wherein each of the two panels is slidable independently of each other.

11. The wall plate of claim 9 wherein each of the pair of panels is biased closed by the springs.

12. The wall plate of claim 9 wherein each panel is retained in the closed position by at least one locking tab.

13. The wall plate of claim 12 wherein each locking tab is controlled by the at least one release button.

14. A wall plate, comprising:
a base comprising a front surface, a rear surface, and at least four sides;
a recessed portion within the front surface of the base, the recessed portion comprising a backing wall with one or more electrical openings sized large enough to receive an electrical receptacle face;
two elongated slots extending through the backing wall and between a first side of the four sides and a second side of the four sides opposite the first side;
at least two protrusions extending from the rear surface of the base, each of the at least two protrusions aligned with a different elongated slot;
at least one panel slidably coupled to the base and slidable between a closed position covering the one or more electrical openings and an open position uncovering the one or more electrical openings;
two mounting tabs coupled to the at least one panel, the two mounting tabs extending through and slidable within the two elongated slots; and
at least two springs that bias the at least one panel to the closed position, each spring coupled to a different one of the two protrusions and a different one of the two mounting tabs.

15. The wall plate of claim 14, further comprising:
at least one notch on the panel;
at least one release button on the base;
at least one locking tab coupled to the rear surface of the base, the at least one locking tab comprising a locking member that extends into the at least one notch when the at least one panel is in the closed position and withdraws from the at least one notch responsive to compression of the at least one release button.

16. The wall plate of claim 15, wherein:
the recessed portion extends from the first side to the second side;
the one or more electrical openings comprises two electrical openings;
the at least one panel comprises two panels each comprising at least one slot and two mounting tabs extending through the two elongated slots, each of the two panels independently slidable between a closed position covering a different one of the two electrical openings and an open position uncovering the different one of the two electrical openings;
the at least two protrusions comprise four protrusions;
the at least two springs comprise four springs;
the at least one release button comprises at least two release buttons;
the at least one locking tab comprises at least two locking tabs, each of the at least two locking tabs comprising a locking member that extends into the at least one notch of a different panel when in the closed position and withdraws from the at least one notch responsive to compression of one of the at least two release buttons.

* * * * *